(12) United States Patent
Lochschmied

(10) Patent No.: US 7,090,486 B2
(45) Date of Patent: Aug. 15, 2006

(54) CONTROL DEVICE FOR A BURNER AND ADJUSTING METHOD

(75) Inventor: Rainer Lochschmied, Rheinstetten (DE)

(73) Assignee: Siemens Building Technologies AG, Zürich (CH)

(*) Notice: Subject to any disclaimer, the term of this patent is extended or adjusted under 35 U.S.C. 154(b) by 0 days.

(21) Appl. No.: 10/489,493

(22) PCT Filed: Sep. 3, 2002

(86) PCT No.: PCT/IB02/03565

§ 371 (c)(1),
(2), (4) Date: Oct. 8, 2004

(87) PCT Pub. No.: WO03/023283

PCT Pub. Date: Mar. 20, 2003

(65) Prior Publication Data
US 2005/0037301 A1  Feb. 17, 2005

(30) Foreign Application Priority Data
Sep. 13, 2001  (EP) .................................. 01122047

(51) Int. Cl.
*F23N 5/12* (2006.01)

(52) U.S. Cl. .................. 431/25; 431/12; 431/14; 431/75; 431/90

(58) Field of Classification Search ............ 431/12, 431/75, 77, 78, 24, 25, 90, 89, 13, 14, 15; 436/154; 324/468; 340/579
See application file for complete search history.

(56) References Cited

U.S. PATENT DOCUMENTS

| 4,588,372 A | * | 5/1986 | Torborg ..................... 431/78 |
| 5,049,063 A | * | 9/1991 | Kishida et al. ............... 431/78 |
| 5,401,162 A | * | 3/1995 | Bonne ......................... 431/12 |
| 5,924,859 A | * | 7/1999 | Nolte et al. .................. 431/12 |
| 6,129,542 A | * | 10/2000 | Gauba et al. ................. 431/12 |

FOREIGN PATENT DOCUMENTS

| DE | 44 33 425 A1 | * | 3/1996 |
| DE | 198 54 824 C1 | * | 6/2000 |

* cited by examiner

*Primary Examiner*—Josiah C. Cocks
(74) *Attorney, Agent, or Firm*—Maginot, Moore & Beck

(57) ABSTRACT

The invention relates to a control system (15) for a burner and a setting-up procedure. The control system (15) controls the air ratio for combustion using the ionisation electrode (16). For calibration, a change is carried out in a first parameter, and the subsequent change in a second parameter is observed. Accurate expected values for the change observed come from stored characteristic data that have been determined in the setting-up procedure, and from taking into account the current combustive content of air and fuel. This allows corrective measures or fault signals to be established.

14 Claims, 3 Drawing Sheets

CONTROL DEVICE FOR A BURNER AND ADJUSTING METHOD

BACKGROUND OF THE INVENTION

1. Field of the Invention

The invention relates to a control system.

2. Description of the Prior Art

The control system ensures that in a burner the ratio of the amount of air to the amount of fuel, called the air ratio or lambda, is matched in the whole performance range. As a rule lambda should be slightly above the stoichiometric value 1, for example, 1.3.

In a manner different to controlled burners, burners adjusted according to the air ratio react to external influences that change the combustion. For example, the combustion can be re-adjusted after a change in the type of fuel or the air density. It has a higher degree of effectiveness and thereby a greater efficiency and lower emissions of contaminants and soot. Environmental pollution is lower, and the lifespan is prolonged.

Burners adjusted according to the air ratio do not react properly to all the influences that change combustion, however, regardless of their construction. Adjustment can thus sooner or later become inaccurate. This makes regular monitoring or calibration advantageous.

Typically, calibration is required because the air resistance in the air supply duct or exhaust duct increases due to emission of soot or to foreign bodies. Rather less often, but equally affecting, is the reverse case, where the air resistance decreases because of unintentional perforation of the ducts. Often, the inflow of air is determined by an external performance signal, and the control system adjusts the inflow of fuel to a reference control value corresponding thereto, even if the actual inflow of air no longer conforms to the performance signal.

Many a large burner senses the airflow volume, for example, via pressure sensors, and can thus compensate for changes to it to a certain extent. Sooner or later the sensor result will no longer be reliable, however. Simple burners rely exclusively on the air blower speed generated by a Hall sensor or on the position of a flap resulting from electrical resistance measurement, or even just on the present actuating signal.

DE-A1-4429157 discloses a monitoring method for air ratio control. Changing of a second parameter as a result of the change in a first parameter is observed, that is to say the changed value of the sensor signal in response to a controlled, fixed change in an actuator. It is decided, from the difference between this observation and stored reference values, whether a fault indication will be output.

DE-A1-4429157 did not specify for which types of sensor the monitoring method is suitable. The same applicant later described a completely different calibration method specifically for burners in which the sensor for controlling the air ratio is formed by the ionisation electrode. This is found in EP-A2-1002997, and will be described hereinafter.

Control of the air ratio is particularly effective when the combustion quality can be directly or indirectly observed with a sensor. Typically with known burners, oxygen sensors are used in the exhaust gas duct, temperature sensors on the burner surface, or UV sensors in the combustion chamber. These sensors are expensive, unreliable and high-maintenance for this purpose, and/or have a short lifespan.

Newer developments are based on the ionisation electrode that has been used as standard for a long time for monitoring the flame in burners. Although it is not easy to evaluate its signal, the ionisation electrode does not have the disadvantages described hereinabove.

Any changes to the ionisation electrode typically require calibration. It can be changed by bending, wear or chemical attack to its surface, or by soiling with soot particles. The control system then attempts to structure the combustion erroneously, such that measurements at a reference control value based on an unchanged ionisation electrode are kept to.

According to EP-B1-770824, in order to calibrate a burner controlled by ionisation flow where there is a fixed fuel flow volume, the air supply is reduced from its controlled value, past a point where the ionisation signal reaches its maximum stoichiometric value. This maximum is established. The difference between the newly established and the stored, previous maximum, allows the burner control to determine new reference ionisation values for the combustion at the desired air ratio.

By means of richer combustion, this method enables simple and reliable determination of a measured value without playing a role in at what level of air supply this measured value is obtained or how the ionisation signal depends exactly on the air supply.

Also in EP-A2-1002997 and DE-C1-19854824, calibration methods for ionisation flow controlled burners have been described. These include sensing of a second measured signal that is representative of the present performance, even though in connection with the ionisation signal. The second measured signal is always a second, different type of ionisation signal in DE-C1-19854824 and in particular instances in EP-A2-1002997.

In DE-C1-19854824, it is apparently assumed that the second ionisation signal is barely sensitive enough for the instantaneous values of the burner performance in terms of measurement of the thermal electron output from the ionisation electrode. Similarly, according to EP-A2-1002997 a second ionisation signal can be generated that, in contrast to the first, is dependent upon the burner performance and the air ratio, and in fact with the aid of a special evaluation circuit is absolutely no longer dependent upon the burner performance.

The known calibration methods do not at present change the normal operation of the burner. Testing is simply done as to whether the burner performance and the air ratio from the different ionisation signals are still in agreement with one another. When this is the case, the control method remains unchanged. Only when certain threshold values have been exceeded is it adapted.

Controlling adaptation takes place in DE-C1-19854824 in that the inflow determined from the performance signal, for example, the inflow of air, is changed until the second ionisation signal has an acceptable value again. Meanwhile, the other inflow is readjusted exactly as previously. In this way erroneous changes to the air ratio and to the burner performance should be reversed. As soon as a stable state is obtained, the first ionisation signal is measured. Lastly, this measured value is adopted as the new reference value for the first ionisation signal.

Provided that the second measured signal is reliable, this method can test whether the correct air ratio is present, without affecting controlling. The changes required for any controlling adaptation are immediately effective as they are simply to be directed towards approximation to the fixed value of the second measured signal or to the desired relationship thereof to the ionisation signal.

SUMMARY OF THE INVENTION

The object of the invention is to make possible a control system that implements reliable and accurate calibration without large variations in the air ratio.

According to a first aspect of the present invention, there is provided a control system for a burner with at least one ionisation electrode arranged in a flame region of the burner and with an actuating member that affects the amount of fuel or air supplied dependent upon an actuating signal, wherein the control system comprises an ionisation evaluation means connectable to the ionisation electrode, which means generates an ionisation signal, a controller that generates a control value x as value for the actuating signal at least periodically dependent upon the ionisation signal, and a calibration unit to which the control value x is supplied and that, during calibration, after changing a reference control value, establishes one or more times a value for the subsequent change in the control value x, and wherein a control system characteristic data for determining a value to be expected there for are stored, wherein the calibration unit determines the differential value the established value and the expected value, and wherein the calibration unit in the control system newly determines values by means of one or more such differential values.

Burners of the most varied design are possible as the burners, for example, pre-mix gas burners or atmospheric burners with or without auxiliary blowers. In the case of atmospheric burners without auxiliary burners, the airflow volume can be controlled, for example, by means of an air flap or the like.

The first parameter that is changed during calibration is, for example, a reference value for control, that is to say a reference control value. Alternatively, a control parameter, the result of evaluation of an additional measured signal, and so forth, can be selected.

For example, the first, as well as the second, parameter is part of the normal control loop. The control loop can, however, also be interrupted at a point after the second and before the first parameter.

In an advantageous further development of the invention, while it is changing, the second parameter is influenced by the ionisation electrode.

The ionisation electrode has also proved to be a suitable sensor for this purpose, and even for calibration for correcting the status, although it falls short of the desired air ratio range in terms of accuracy. Alternatively, an additional status sensor, such as a second ionisation electrode or an oxygen sensor, is used exclusively for calibration.

In order to implement calibration according to the invention, the calibration unit advantageously changes the first parameter on its own initiative. Alternatively it waits until a suitable change is produced in the normal operation, for example by a stepwise increase of the external performance signal. The first parameter is then advantageously kept constant while the second parameter is changing. Regardless of the design of the control system, however, alternative behaviour may be demanded.

The calibration unit additionally determines a value to be expected for the second parameter, and the difference thereof to the actual value determined. With the aid of one or advantageously of several such differential values, it then newly determines certain values. Differential values that were already determined during earlier calibration can also be used. Advantageously, the calibration unit weights the differential values such that the newer ones have a greater weighting than the older ones.

If previous control has proved to be good enough for there to be no requirement for adaptation, certain calibration units according to the invention newly determine the values such that they are allowed to remain the same.

If, however, the information acquired in calibration indicates that previous operation is unstable or unacceptable, certain calibration units according to the invention generate an alarm signal or shut down the burner by changing appropriate values. In this broad sense, calibration can be considered not just as a correction, but additionally or exclusively as monitoring for the burner operation.

If, however, an opportunity for adaptation is established, certain calibration units according to the invention newly determine a stored reference control value, the value of which is adopted or triggered in the specific control system in normal operation. This can occur in the form of a controlled correction or master control. Above all, it is intended that the air ratio be corrected to its earlier, desired value. Ideally, the performance delivered by the burner is also corrected back. Simpler variations of the invention do not do this in every case, however.

In control systems according to the invention, characteristic data for determining behaviour of the ionisation signal as a function of the performance signal can be stored. Such a control system generates a reference ionisation value appropriate for the behaviour, and its controller then controls the ionisation signal using the actuating signal. New determination of the ionisation reference value then takes place, for example, in that a value dependent upon the performance signal or a constant value is added or subtracted. The size of this value is established by means of a function of the previously determined differential values, or else by master control that attempts to iteratively reduce the differential values sensed in the calibrations.

It has already been described hereinabove that the control system according to the invention can determine the expected value of the change in the second parameter, which is done using stored characteristic data. It has been shown that these characteristic data are as a rule specific to the type of burner. They are determined or calculated in a setting-up process with one or more burners, and copies are stored in control systems for the same type of burner. This does not exclude another individual fine-tuning taking place when commissioning is done, for example to adjust construction tolerances.

In an advantageous further development of the invention, in order to determine the expected value, the characteristic data include for determining behaviours of the second parameter to be expected with different combustive contents of fuel and air.

The combustive content of the air is determined by means of its oxygen content. This depends on the air pressure, the air temperature and the humidity of the air. The combustive content of fuel relates to its specific energy content. During burner operation and from one calibration to another the combustive content of both fuel and air can show variations. When the control system takes into account the combustive content during calibration, however, it can determine the expected value of the change in the second parameter substantially better.

In particular, the behaviours of the second parameter can be those changes expected after a specific change in the first parameter, this being with different, but in each case steady, combustive contents of fuel and air.

In an advantageous further development of the invention, before their respective changes, the calibration unit brings the first and the second parameter to their respective initial values, which are thus different from those in normal operation. In this way, changes in the parameters can be adjusted, for the purpose of greater sensitivity, to an optimum operating point. For example, the first parameter is returned in advance to its initial value, and is monitored until the second has been brought back to its corresponding initial value by means of the normal control loop.

In an advantageous further development of the invention, the values to be newly determined include an initial value for the first parameter, stored in the control system.

Master control can thus exist in that reference initial values improved in the subsequent calibration are always present. Advantageously, the calibration unit weights the initial values such that the newer ones are more heavily weighted than the old ones. After a few times, the calibration unit can then newly determine such values. For example, a correction takes place in which, by adjusting the ionisation reference values under conditions of calibration, a fixed difference between the improved initial value and the first control parameter can be re-established.

In an advantageous further development of the invention the values newly to be determined include a reference control value that affects the dependency of the controller upon the performance signal.

A performance signal is understood as the signal that represents the required performance. This further development enables correction of the performance where there is a change in the supply of air or fuel that is not compensated for by the control system.

According to a second aspect of the present invention, there is provided a method for setting-up a control system for a burner with at least one ionisation electrode arranged in a flame region of the burner, and with an actuating member that affects the amount of fuel or air supplied dependent upon an actuating signal, wherein the control system comprises an ionisation evaluation means connected to the ionisation electrode, which means generates an ionisation signal, a controller that generates the actuating signal at least periodically dependent upon the ionisation signal, and a calibration unit, and wherein the burner possibly comprises additional sensors for establishing the quality of the combustion, the burner is operated one or more times and thereby changes a first parameter, and a value for the subsequent change in a signal generated by a control loop is determined.

Normally, the setting-up process comprises measurements of a burner, wherein combustion is desirably in operation. The measurement results can be expanded by estimations that are based on expert knowledge or on the type of burner.

The descriptions hereinabove with respect to the first parameter, the second parameter and the changes thereto are also valid in this case.

In setting-up control systems according to the invention, characteristic data can be derived for determining the expected value for changing a second parameter during calibration. The behaviour of the burner is then observed under varying conditions that are similar to the changes in the parameter during calibration, but do not necessarily correspond to them.

The characteristic data thus derived can be stored in further control systems according to the invention.

In an advantageous further development of the invention, the burner is also operated at least once with a fuel with a different combustive content.

Advantageously, the specific energy content is reduced by at least 2% when the fuel is changed.

The setting-up process can also serve to refine any corrective measures during calibration. For this, measurements are carried out on modified burners that require correction of certain aspects. For example, the ionisation electrode is replaced with an example with a very long operating time, or an additional resistance is connected in series to the ionisation electrode to simulate this. Further examples relate to its bending or covering with a coating or the installation of a significant flow resistance in the air supply channel.

In an advantageous further development of the invention, the burner is set up at least once before operation in that the combustion no longer has the desired air ratio prior to changing the first parameter and/or produces the desired power output. At the end of such an operation the combustion is improved in that a reference control value is newly determined.

From the newly determined reference control value, characteristic data can be derived for newly determining values during calibration.

In an advantageous further development of the invention, the burner is set up prior to operation such that an additional resistance is connected in series to the ionisation electrode.

DESCRIPTION OF THE PREFERRED EMBODIMENTS

Figure 1:
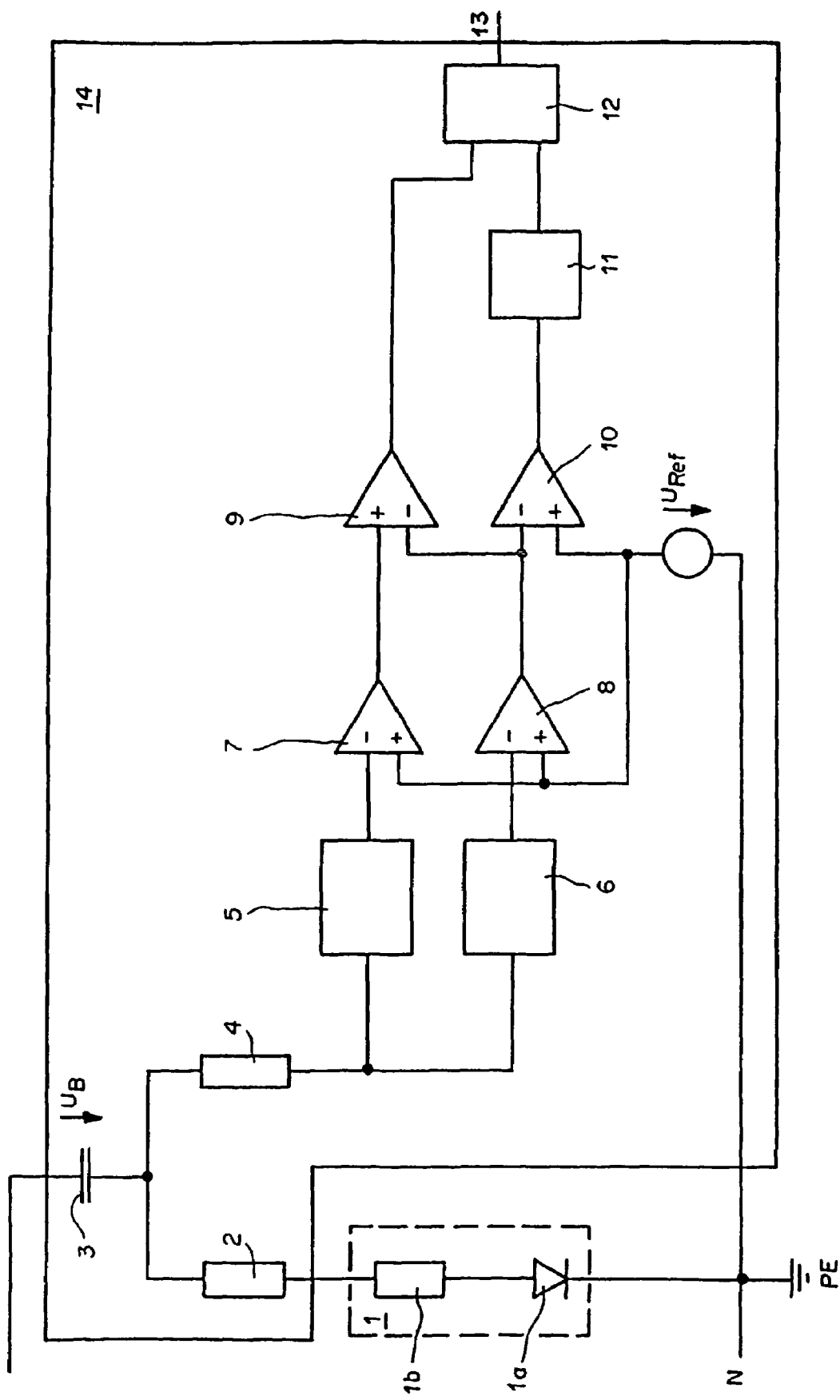
FIG. 1 shows a block diagram of an ionisation evaluating means in a control system according to the invention.

FIG. 1 shows schematically the principle of functioning of an ionisation evaluating means 14 in a control system in accordance with the invention. In an equivalent circuit, the flame 1 is represented by a diode 1$a$, and a resistance 1$b$. An alternating voltage of, for example, 230V, is applied via L and N. When a flame 1 is present, because of the flame diode 1$a$ a greater current flows through the blocking capacitor 3 in the positive half-wave than in the negative half-wave. In this way, a positive direct voltage $U_B$ forms between L and a resistance 2 fitted for the purpose of shock protection, at the blocking capacitor 3.

A direct current thus flows through a decoupling resistor 4 from N to the blocking capacitor 3. The level of direct current is dependent upon $U_B$ and thus directly upon the flame resistance 1$b$. The flame resistance 1$b$ also affects the alternating current through the decoupling resistor 4, although to a different extent compared to the direct current. Consequently, a direct current and an alternating current flow through the resistance 4, as described above.

A high pass filter 5 and a low pass filter 6 are connected after the resistance 4. The alternating current is filtered out by means of the high pass filter 5, and the direct voltage component is blocked off. The direct voltage component dependent upon the flame resistance 1$b$ is filtered out by means of the low pass filter 6, and the alternating current is substantially blocked off. The alternating current flowing from the high pass filter 5 is amplified in an amplifier 7, and a reference voltage $U_{Ref}$ is added to it. In an amplifier 8 the direct current flowing from the high pass filter 6 is amplified with possible small alternating current components, and the reference voltage $U_{Ref}$ is added to it.

The reference voltage $U_{Ref}$ can be selected as desired, for example $U_{Ref}=0$, but is preferably selected such that the amplifiers and comparators require only one supply.

At a comparator 9, the alternating voltage output by the amplifier 7 and the direct voltage output by the amplifier 8 are compared to one another, and a pulse width modulated (PWM) signal is generated. If the amplitude of the system voltage changes, the alternating voltage and direct voltage change in the same proportion, but the PWM signal does not change. The signal deviation of the PWM signal can be adjusted by means of the amplifiers 7 and 8 in a broad range between $\tau=0$ and $\tau=50\%$ pulse duty factor.

The direct voltage component U= is compared in a comparator 10 to the reference voltage $U_{Ref}$. If a flame is present, the direct voltage component is greater than the reference voltage ($U=>U_{Ref}$) and the comparator output of the comparator 10 switches to 0. If no flame is present, the direct voltage component is approximately equal to the reference voltage ($U=\approx U_{Ref}$). Because of this, the small alternating voltage component superimposed on the direct voltage component that is not filtered out by the low pass 6, the direct voltage component briefly falls below the reference voltage and pulses appear at the comparator output of the comparator 10. These pulses are supplied to a monoflop 11 that is not triggered.

The monoflop 11 is triggered such that the pulse sequence output by the comparator 10 comes faster than the pulse duration of the monoflop. Thus, when no flame is present, a 1 appears constantly at the output of the monoflop. If a flame is present, the monoflop is not triggered and a 0 appears permanently at the output The monoflop 11 not triggered consequently forms a "missing pulse detector" that converts the dynamic on/off signal into a static on/off signal.

Both signals, the PWM signal and the flame signal, can now be further processed separately or be interlaced by means of an OR element 12. As an output of the OR element 12, where flames are present a PWM signal appears, the pulse duty factor of which is a value for the flame resistance 1b. This ionisation signal 13 is supplied to a controller 26 shown in FIG. 2. Where no flame is present, the output of the OR element is permanently set at 1. The ionisation signal 13 can be transmitted via an optical coupler, not shown, in order to obtain protective separation between the supply side and the safety extra-low voltage side.

Figure 2:
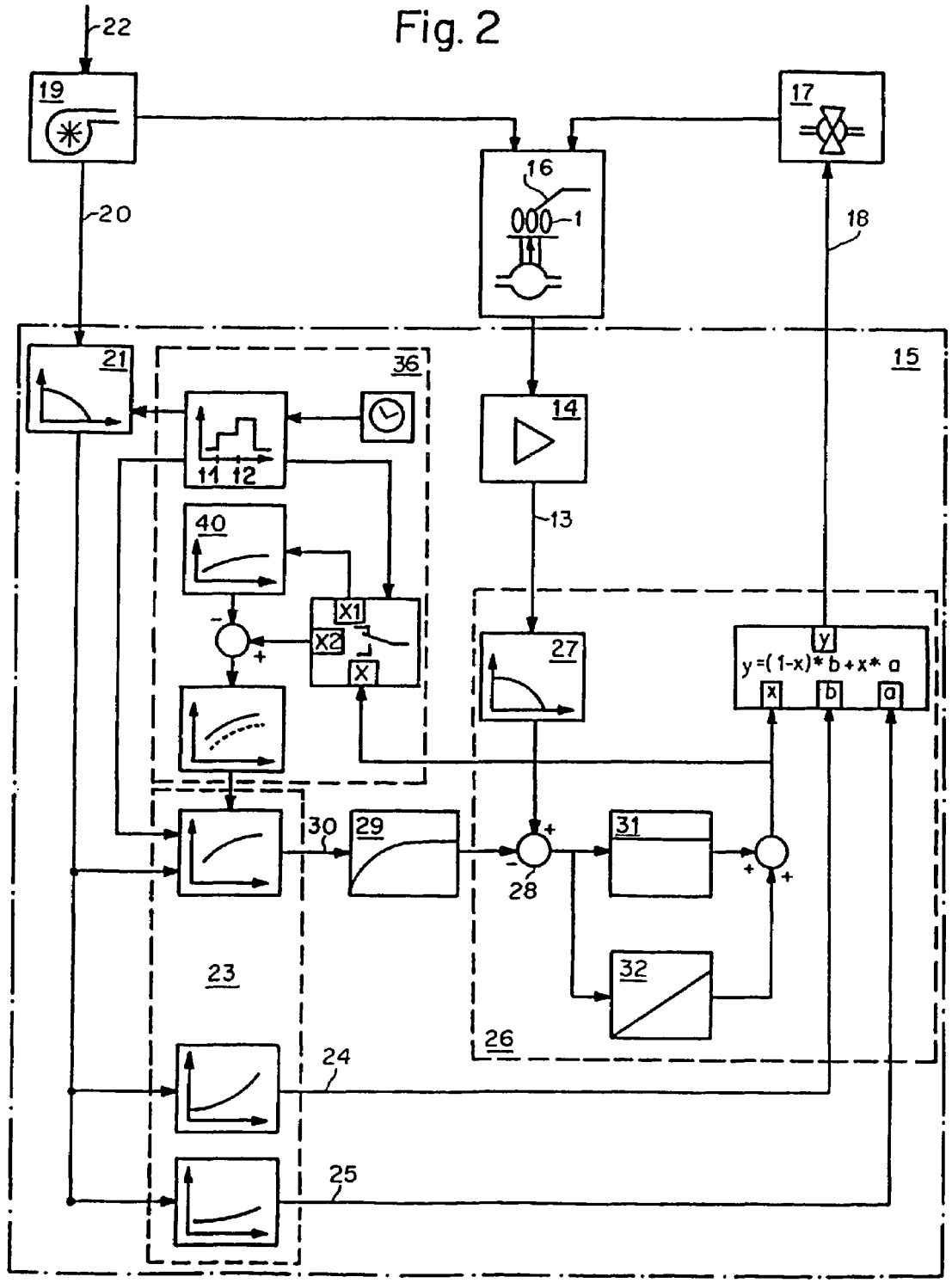
FIG. 2 shows a block diagram of the control system.

FIG. 2 shows schematically a block diagram of a control system 15 according to the invention.

An ionisation electrode 16 projects into the flames 1. A gas valve 17 is controlled by an actuating signal 18 in a direct or indirect manner, for example by means of a motor. Alternatively another mechanical pressure controller is inserted.

An air blower 19 is controlled to a speed that is used here as an input parameter. It is assumed that the speed corresponds to a performance 22 requirement. A speed signal 20 is supplied via a filter 21 to a control unit 23 that is designed as part of a program for running in a microprocessor. Here, characteristic data are stored that establish the characteristic curves of a first and a second control signal 24 and 25. A controller 26 weights and adds together the two control signals and thus determines the actuating signal 18. This processing of the control signals is dependent upon the ionisation signal 13.

The ionisation signal 13 is firstly smoothed by the controller 26, firstly by means of a low pass filter 27, in order to suppress glitches and instabilities. In a comparator 28, a reference signal generated by the control unit 23 and supplied via a corrective unit 29 is subtracted. From the sequence signal of this processing of the ionisation signal, an internal control value x is determined from a proportional controller 31 and a parallel integrating unit 32, which value weights the two control signals 24 and 25, and thereby finely adjusts the actuating signal 18.

The control value x can alternatively be generated by a PID controller or a status controller from the sequence signal.

The control value x is additionally supplied to a calibration unit 36 as a value for the actuating signal 18.

The calibration unit 36 includes a clock that triggers calibrations at regular intervals. When it is time, the calibration unit 36 firstly brings the air blower speed to a fixed, predetermined value, and in a fixed, predetermined step increases the reference signal 30 in order to easily bring the system closer to the stoichastic combustion point in a sensitive working region.

After this it senses the steady state control value x as an index for the current combustive content of fuel and air.

The calibration unit 36 then increases the reference signal 30 again in a second, predetermined step. This forms the change in the first parameter that is important with respect to the invention, namely the reference signal 30. In response to this, the controller 26 governs the actuating signal 18 by reducing the control value x to a yet rather richer combustion.

After 12 seconds, when the control value x is in its steady state again, it is sensed again. The comparison with its initial value forms the change in a second parameter, namely the control value x.

Using stored characteristic data, the calibration unit 36 calculates an expected value 40 for the changed control value x with the prevailing combustive content, and subtracts from it the actual changed control value x. A possible difference is an index that the air ratio in normal operation does not have the value desired, and combustion was too rich or too lean.

The expected value 40 for the changed control value x is produced by adding its initial value and its expected change together. The expected change in the control parameter x again results from a third order polynominal development of its initial value, the constants of which were determined in a setting up process and were stored as characteristic data in the control system.

By means of an exponential weighting, the calibration unit 36 now averages the differential value with the average value of the differential values of previous calibration, such that the newer ones are more heavily weighted than the older ones.

If the average value thus newly determined exceeds certain thresholds, the calibration unit 36 indicates emergency operation or even shuts down operation.

When this is not the case, when a low threshold value is gone below, the calibration unit 36 passes generation of the reference signal 30 to the actuating unit 23, in that with each speed signal 20 it adds or subtracts a small value. Accordingly, combustion in normal operation is made a little richer or leaner.

Instead of this, an alternative calibration unit according to the invention modifies the two steps to the same extent, in that the reference signal 30 is increased at the beginning of the next calibration. Only with every tenth calibration does it pass generation of the reference signal 30, because its consequently improved values, to the actuating unit 23.

By repetition, the air ratio in normal operation is moved iteratively towards its desired value.

Figure 3:
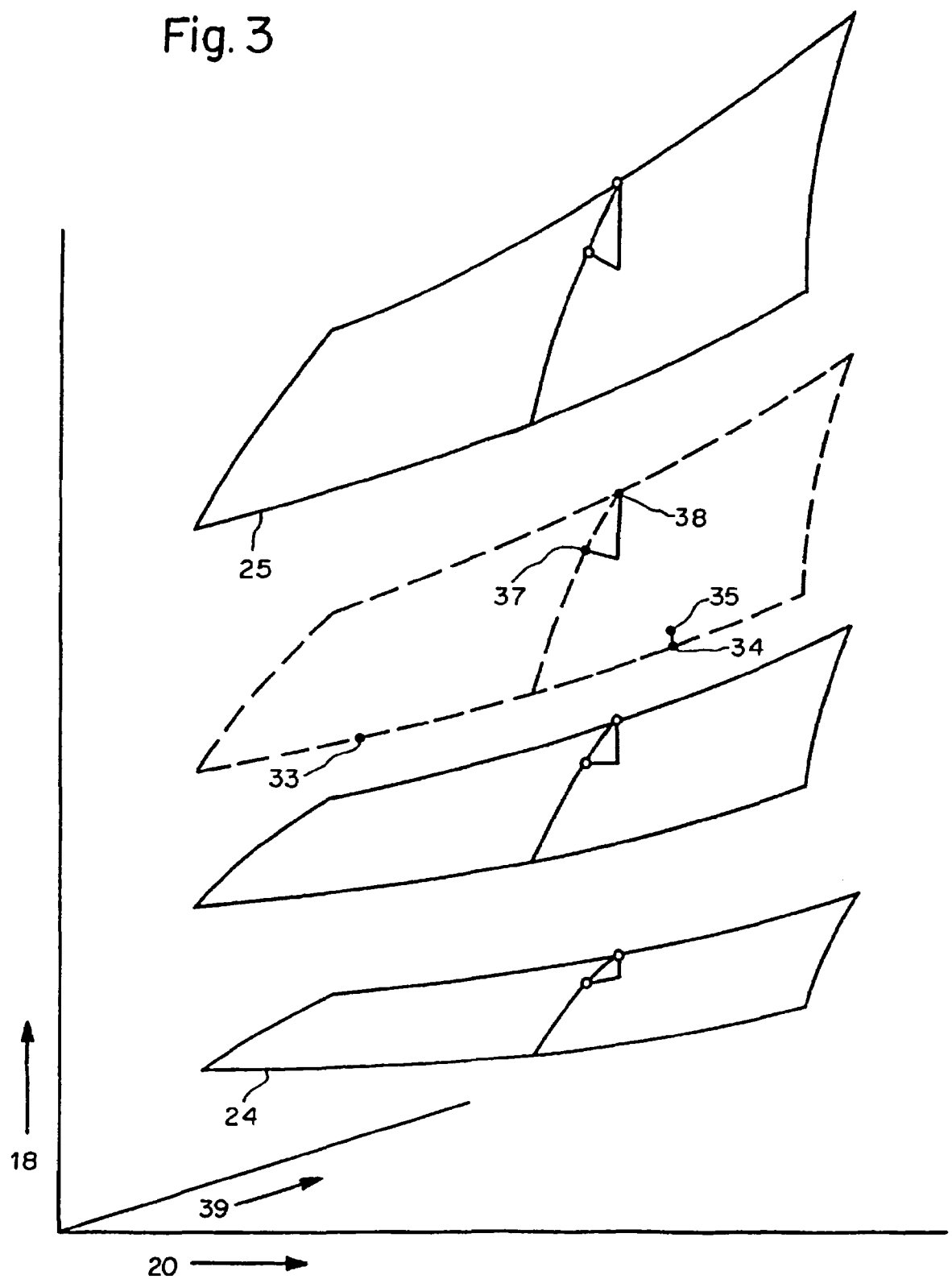
FIG. 3 shows the expected behaviour of the actuating signal of the control system in the case of four different combustion contents and with different air ratios.

FIG. 3 shows schematically the behaviour of the actuating signal 18 as a function of the speed signal 20 in a properly set-up burner. It also shows how the actuating signal would change, according to expectations, if an increase 39 in the reference signal 30 takes place in normal operation, and thereby a richer combustion.

The surfaces shown represent certain, different combustive contents of fuel and air. The front edges of the upper and lower surface form the characteristic curves of the control signals 24 and 25. They each relate to a fuel with a rather high and respectively a rather low calorific value, and are established in a setting-up process from each of four measurement points, not shown, as a polynominal development.

In normal operation, as a rule the fuel has an average combustive content. This is shown by the surface with the broken line edge. The control system 15 controls the actuating signal 18 by means of weighting of the control signals 24 and 25 to an almost optimum value 33 for the desired air ratio. This fine controlling corresponds to matching, inter alia, of the prevailing combustive content of fuel and air and corresponds to a vertical movement in FIG. 3.

If there is now a stepwise increase in the performance requirement 22 and a corresponding change in the speed signal 20 takes place, the weighting of the two control signals 24, 25 remains largely unaffected. The control signals 24 and 25 themselves increase quickly with the change in speed to their respective higher values along the characteristic curves, and the actuating signal 18 also increases rapidly to the value 34. This controlled value 34 of the actuating signal 18 is normally already very accurate, that is to say close to an optimum value for the desired air ratio.

As soon as the ionisation signal 13 has balanced itself to the new status, typically after a few seconds, the weighting of the control signals 24 and 25 are further refined, and in FIG. 3 the actuating signal 18 normally moves only a little, vertically.

However, should the actuating signal 18 nevertheless correct itself to a varying value 35, a fault signal or correction of the reference signal 30 is required. An alternative calibration unit according to the invention uses this accuracy in the control signals 24 and 25 for establishing the actuating signal 18 shortly after a change in the speed, and then again after the system has reached a steady state.

At the beginning, however, the calibration unit 36 firstly adjusts the air blower speed and the reference signal 30 to values that, in the case of a properly set-up burner, correspond to a point 37 in FIG. 3. In practice, it can be assumed that the system has consequently been brought into a more sensitive working area.

After acquiring the steady state control value x as the index for the current combustive content of fuel and air, in a second step the calibration unit 36 increases the reference signal 30 again, which in the case of a properly set-up burner corresponds to moving to a point 38.

The expected value 40 for the latterly described change in the control value x thus corresponds to the height difference between points 37 and 38 in FIG. 3. It is added to the initial value of the control value x. After 12 seconds a comparison with the actual, changed control value x takes place. This leads to possible corrective measures or fault signals.

The characteristic data required for calculating the expected value 40 are previously derived in a setting up process using control value measurements with in total three different known combustive contents of fuel and air.

Additionally, the reference signal 30 is increased with the same steps from its value during normal operation, firstly to reach the more sensitive working area and then in order to determine the subsequent change in the control value x. In FIG. 3 the actuating signal values corresponding to the measurements of the control value x are represented by small circles.

In fact, the constants of an accurate third order polynominal development for the steady state control value x are thus found for the expected value for its change. The steady state control value x represents the prevailing combustive content of fuel and air. It has been shown that it represents the combustive content sufficiently accurately, even if the air ratio varies in normal operation from the air ratio desired, or if the combustive content of fuel and air changes again within the usual bounds during calibration.

While it is superfluous for simple calibrations, the setting-up process can alternatively be refined in that characteristic data are additionally determined at different speed values. Calibration is also performed at these speeds.

An alternative calibration unit according to the invention can, inter alia, determine a possible fault in this way, namely in particular whether the flow resistance of air or fuel has changed. In such a case, the alternative calibration unit newly calibrates the speed signal 20 in order to correct the power output back. This relates not just to the characteristic curve for generating the reference value signal 30 but also, for example, to the two characteristic curves of the control signals 24 and 25.

I claim:

1. Control apparatus for a burner, having at least one ionization electrode disposed in a flame region of the burner, and having an actuating element, which influences the feed quantity of fuel or air in dependence upon an actuating signal, the control apparatus at least being equipped with an ionization analyzer, which is connected downstream of the ionization electrode and generates an ionization signal, and having a controller, which generates a control value x as measure of the actuating signal, at least occasionally in dependence upon the ionization signal, the control value x being fed to a calibrating unit, wherein the calibrating unit establishes one or more times after the change in a control set value the consequential change in the control value x, and in that the calibrating unit determines, on the basis of characteristic data stored in the control apparatus, an expected value for the changed control value x, and in that the calibrating unit performs at least one comparison between the established change in the control value x and the expected value, and in that, independently from the comparison result, and the calibrating unit newly determines, using one or more differential values acquired from the comparison, the control set value stored in the control apparatus, or generates a disturbance signal.

2. Control system for a burner according to claim 1, wherein, during its changing, the control value x is affected by the ionisation electrode.

3. Control system for a burner according to claim 1, wherein the characteristic data for determining the expected value include characteristic data for determining the behaviour of the control value x to be expected with different combustive contents of fuel and air.

4. Control system for a burner according to claim 1, wherein, prior to their respective changes, the calibration unit returns the control set value and the control value x to their initial values.

5. Control system for a burner according to claim 4, wherein the values to be newly determined include an initial value for the control set value stored in the control system.

6. Control system for a burner according to claim 1, wherein the control set value to be newly determined affects the dependency of the controller upon the ionisation signal.

7. Method for adjusting a control system for a burner having at least one ionization electrode disposed in a flame region of the burner, and having an actuating element, which influences the feed quantity of fuel or air in dependence upon an actuating signal, the control system at least being equipped with an ionization analyzer, which is connected downstream of the ionization electrode and generates an ionization signal, and having a controller, which generates a control value x as measure of the actuating signal, at least occasionally in dependence upon the ionization signal, the control value x being fed to a calibrating unit, wherein, during a calibration, the burner is operated one or more times and a control set value is hereupon changed and the consequential change in the control value x determined, and during the calibration, characteristic data for determining an expectancy value for the changed control value x are derived and are stored in the control apparatus.

8. Method for adjusting a control system according to claim 7, wherein the burner is also operated at least once with a fuel with a different combustive content.

9. Method for adjusting a control system according to claim 7, wherein the burner is adjusted at least once prior to operation such that prior to changing the control set value, the combustion no longer has the desired air/fuel ratio and/or no longer generates the desired performance, and at the end of such operating, the combustion is improved in that a control set value is newly determined.

10. Method for adjusting a control system according to claim 9, wherein, prior to operation, the burner is adjusted in that an additional resistance is connected in series to the ionisation electrode.

11. A control system for a burner comprising:

a controller that, based upon a signal from an ionization sensor, is configured to generate an actuating signal for an actuating member that affects the amount of fuel or air supplied to the burner, the actuating signal based on a control signal x, the control signal x being generated by the controller based on the signal from the ionization sensor; and a calibration unit configured to generate an output signal based upon a difference between an estimated expected value and an actual value of the control signal x, wherein the controller is configured to generate the actual value after changing a parameter from a first value to a second value and the estimated expected value is calculated using predetermined characteristic data.

12. The system of claim 11, wherein the calibration unit is configured to generate the output signal based upon a weighted average of a plurality of differences between estimated expected values and actual values of the control value x, wherein the controller is configured to generate the actual values such that the actual values result from changing the parameter from first values to second values and the estimated expected values are calculated using the predetermined characteristic data.

13. The system of claim 12, wherein the calibration unit is configured such that the plurality of differences are weighted that a recently determined difference is weighted more heavily than a less recently determined difference.

14. The system of claim 11, wherein the calibration unit is configured to use the output signal for at least one of a reference control signal, an alarm signal or a shutdown signal.

* * * * *